United States Patent
Venkataraman et al.

(10) Patent No.: US 10,460,271 B2
(45) Date of Patent: Oct. 29, 2019

(54) SYSTEM AND METHOD FOR VALUATING AN AUTOMATION FOR A PROCESS OF AN ENTERPRISE SYSTEM

(71) Applicant: Wipro Limited, Bangalore (IN)

(72) Inventors: Arthi Venkataraman, Bangalore (IN); Ramkumar Balasubramanian, Bangalore (IN)

(73) Assignee: Wipro Limited, Bangalore (IN)

( * ) Notice: Subject to any disclaimer, the term of this patent is extended or adjusted under 35 U.S.C. 154(b) by 441 days.

(21) Appl. No.: 15/359,162

(22) Filed: Nov. 22, 2016

(65) Prior Publication Data
US 2018/0096276 A1  Apr. 5, 2018

(30) Foreign Application Priority Data
Sep. 30, 2016  (IN) .............................. 201641033574

(51) Int. Cl.
*G06Q 10/06*  (2012.01)
*G06Q 10/00*  (2012.01)
*G06N 20/00*  (2019.01)

(52) U.S. Cl.
CPC ....... *G06Q 10/06375* (2013.01); *G06N 20/00* (2019.01); *G06Q 10/20* (2013.01)

(58) Field of Classification Search
CPC .......................... G06Q 10/06375; G06N 20/00
(Continued)

(56) References Cited

U.S. PATENT DOCUMENTS

| | | | | |
|---|---|---|---|---|
| 7,565,304 B2* | 7/2009 | Casati | .............. | G06Q 10/06312 705/7.27 |
| 2008/0312980 A1* | 12/2008 | Boulineau | .............. | G06Q 10/06 705/7.13 |

(Continued)

OTHER PUBLICATIONS

RIA: Robotic Industries Association. ROI robot system value calculator (https://www.robotics.org/robotics-roi-calculator), May 24, 2016. Wayback Machine https://web.archive.org/web/20160627075150/http://www.robotics.org:80/robotics-roi-calculator (Year: 2016).*
(Continued)

*Primary Examiner* — Dylan C White
(74) *Attorney, Agent, or Firm* — Pepper Hamilton LLP

(57) ABSTRACT

Systems and methods for valuating automation are described. The system computes plurality of parameters associated with process. The plurality of parameters comprises time related parameters and cost related parameters. Further, the system determines a total actual cost saved when an automation is applied on the process based on the time related parameters and the cost related parameters. The system further normalizes the total actual cost saved based on the cost related parameters and a cost of automation maintenance. Further, the system determines a value of the automation based on the total actual cost saved after normalization, qualitative parameters associated with the process and the cost of automation maintenance. The value is categorized into at least one of an automate category, a neutral category and a non-automate category. Based on the categorization, the system selects only relevant automations in order to reduce overload of running unnecessary automations, thereby improving system's performance.

12 Claims, 4 Drawing Sheets

(58) Field of Classification Search
USPC .......................................................... 705/7.13
See application file for complete search history.

(56) References Cited

U.S. PATENT DOCUMENTS

2017/0060108 A1* 3/2017 Kakhandiki ......... G05B 13/048
2017/0344344 A1* 11/2017 Gass ........................ G06F 8/61
2018/0365617 A1* 12/2018 Ghosh .............. G06Q 10/06375

OTHER PUBLICATIONS

How to Calculate cost savings of self-service automation, Ayehu (https://ayehu.com/calculate-cost-savings-self-service-automation/). Aug. 18, 2016. (Year: 2016).*

* cited by examiner

SYSTEM AND METHOD FOR VALUATING AN AUTOMATION FOR A PROCESS OF AN ENTERPRISE SYSTEM

This application claims the benefit of Indian Patent Application Serial No. 201641033574 filed Sep. 30, 2016, which is hereby incorporated by reference in its entirety.

FIELD

The present disclosure relates in general to valuation of automation. More particularly, but not exclusively, the present disclosure discloses a method and system for valuating the automation for a process in an enterprise system.

BACKGROUND

Nowadays, automation is not only limited to manufacturing or production industries, in which, different machineries and components are involved, but it (automation) has widely spread across several processes of different level of business organizations. These processes include tasks/activities which are performed for achieving goals of the organizations. The primary focus of implementing the automation is to save effort, energy, time and money required for completing the tasks/activities manually.

With the increase in complexity of these tasks/activities, the complexity of implementing the automation has also increased. To handle this complexity, different enterprise systems are used by the organizations. These enterprise systems are one-stop solution for facilitating automation across complex tasks/activities. However, the challenge is to determine the valuation of the automation for completing the tasks/activities.

Suppose various automation steps (A1, A2, A3 . . . A10) are implemented corresponding to various tasks (T1, T2, T3 . . . T10), then it becomes important to evaluate the implemented automation steps in order to determine their importance and applicability. The importance of these automated steps is determined not only based on effort saved due to their implementation, but it goes much beyond that. Thus, there is a long felt need of a system and method for valuating the need of implementing the automation steps for the process.

SUMMARY

Disclosed herein is a method and system for valuating an automation for a process of an enterprise system. There may be number of automations applicable for different processes. However, some of these automations may not be so much important each time. Thus, to valuate these automation steps, different cost related and time related parameters are computed which are associated with the automation steps. Based on such computation and consideration of the parameters, a value may be determined which may reflect the actual valuation of the automations applied in the process. The different parameters and computations are explained in detail in subsequent paragraphs of the specification.

Accordingly, the present disclosure relates to a method for valuating an automation for a process of an enterprise system. The method comprises the steps of computing dynamically a plurality of parameters associated with the process, whereas, the plurality of parameters comprises time related parameters and cost related parameters. The method further comprises determining a total actual cost saved when an automation is applied on the process based on the time related parameters and the cost related parameters. Further, the method comprises normalizing the total actual cost saved based on the cost related parameters and a cost of automation maintenance. The method further comprises the step of determining a value of the automation based on the total actual cost saved after normalization, qualitative parameters associated with the process and the cost of automation maintenance. Further, the value is categorized into at least one of an automate category, a neutral category and a non-automate category.

Further, the present disclosure relates to an automation system for valuating an automation for a process of an enterprise system. The automation system comprises a processor and a memory communicatively coupled to the processor. The memory stores processor-executable instructions, which, on execution, causes the processor to perform one or more operations comprising computing a plurality of parameters associated with the process. The plurality of parameters comprises time related parameters and cost related parameters. Further, the system determines a total actual cost saved when an automation is applied on the process based on the time related parameters and the cost related parameters. The system further normalizes the total actual cost saved based on the cost related parameters and a cost of automation maintenance. Further, the system determines a value of the automation based on the total actual cost saved after normalization, qualitative parameters associated with the process, and the cost of automation maintenance. Further, the value is categorized into at least one of an automate category, a neutral category and a non-automate category.

Furthermore, the present disclosure relates to a non-transitory computer readable medium including instructions stored thereon that when processed by at least one processor cause an automation system to perform the acts of computing dynamically a plurality of parameters associated with the process. The plurality of parameters comprises time related parameters and cost related parameters. The automation system further determines a total actual cost saved when an automation is applied on the process based on the time related parameters and the cost related parameters. Further, the automation system normalizes the total actual cost saved based on the cost related parameters and a cost of automation maintenance. The automation system further determines a value of the automation based on the total actual cost saved after normalization, qualitative parameters associated with the process and the cost of automation maintenance. The value is categorized into at least one of an automate category, a neutral category and a non-automate category.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
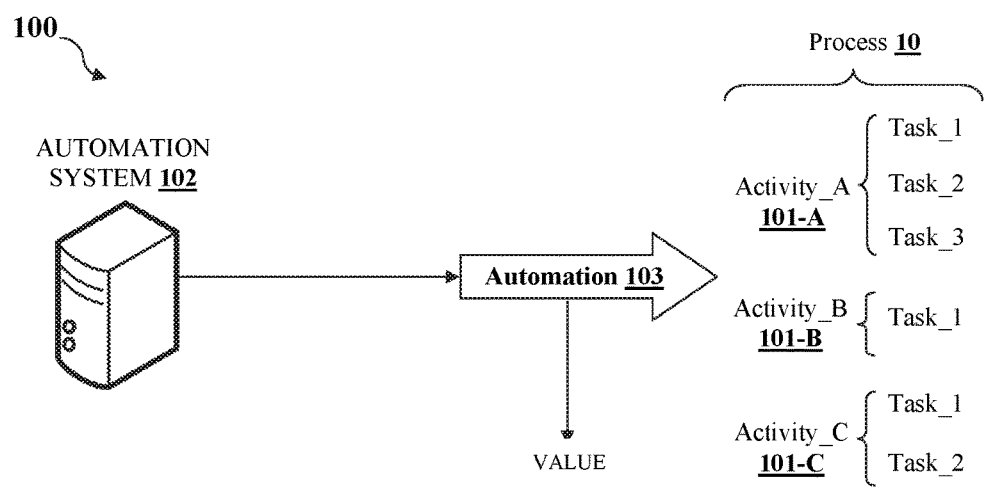
FIG. 1 shows an exemplary environment illustrating an automation system for valuating an automation for a process of an enterprise system in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and an automation system (alternatively also referred as "system") for valuating an automation for a process of an enterprise system. Although, the method for valuating an automation is described in conjunction with a server, the said method can also be implemented in various computing systems/devices, other than the server. Several automation steps are implemented to automate activities and their associated tasks of a process. The purpose of implementing the automation is to save time, energy, and effort consumed during the completion of the said activities and their tasks.

However, out of the several automations applied, there may be few automations which may not be contributing in improving the overall performance of the process as per the expectations. There may be several reasons for such under or non-performance automations. Hence, it becomes quite important to identify those automations which are not performing up to the mark or as expected. Moreover, these non-performance automations may also affect or disturb the performance of other automations. Thus, the valuation of the automations provides a holistic view to a user about the overall performance of processes running in an organization.

For determining the valuation, different time and cost related parameters are computed by the system. These computed parameters give an in-depth performance of the automation not only at activity level, but also at different tasks level associated with the activity. The system also creates a learning model based on the computed parameters and historical information. Once the parameters are computed, the system determines a value of that automation. The value may be categorized into different categories which indicates recommendations for the automation.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment illustrating an automation system for valuating an automation for a process of an enterprise system.

The environment 100 comprises a process 10, the automation system 102 and an automation 103 applied to the process 10. The process 10 may comprise different activities i.e., Activity_A 101-A, Activity_B 101-B, and Activity_C 101-C. Further, one or more tasks are associated with each of the activities. For example, Task_1, Task_2 and Task_3 are associated with Activity_A 101-A. Similarly, Task_1 is associated with Activity_B 101-B and Task_1, Task_2 are associated with Activity_C 101-C.

For determining the value of the automation 103, the process 10 is monitored at different levels of its activities and corresponding tasks. As stated above, the value of automation is not just the efforts saved due to the specific task or activities automated. It is much more complex than that. This is because it includes other factors like speed of completion of the task, quality of the task, impact on downstream and other parallel/related tasks, resource consumed for automation of the tasks, resource consumed for execution of the tasks, and quality factors, for example, user-experience. Thus, all the above factors contribute in determining the value of the automation applied to the process 10. In an embodiment, the automation system 102 may include, but not limited to, a server, a computer, a workstation, a laptop, mobile phone, or any computing system/device capable of receiving, analysing and processing the useful information.

Figure 2:
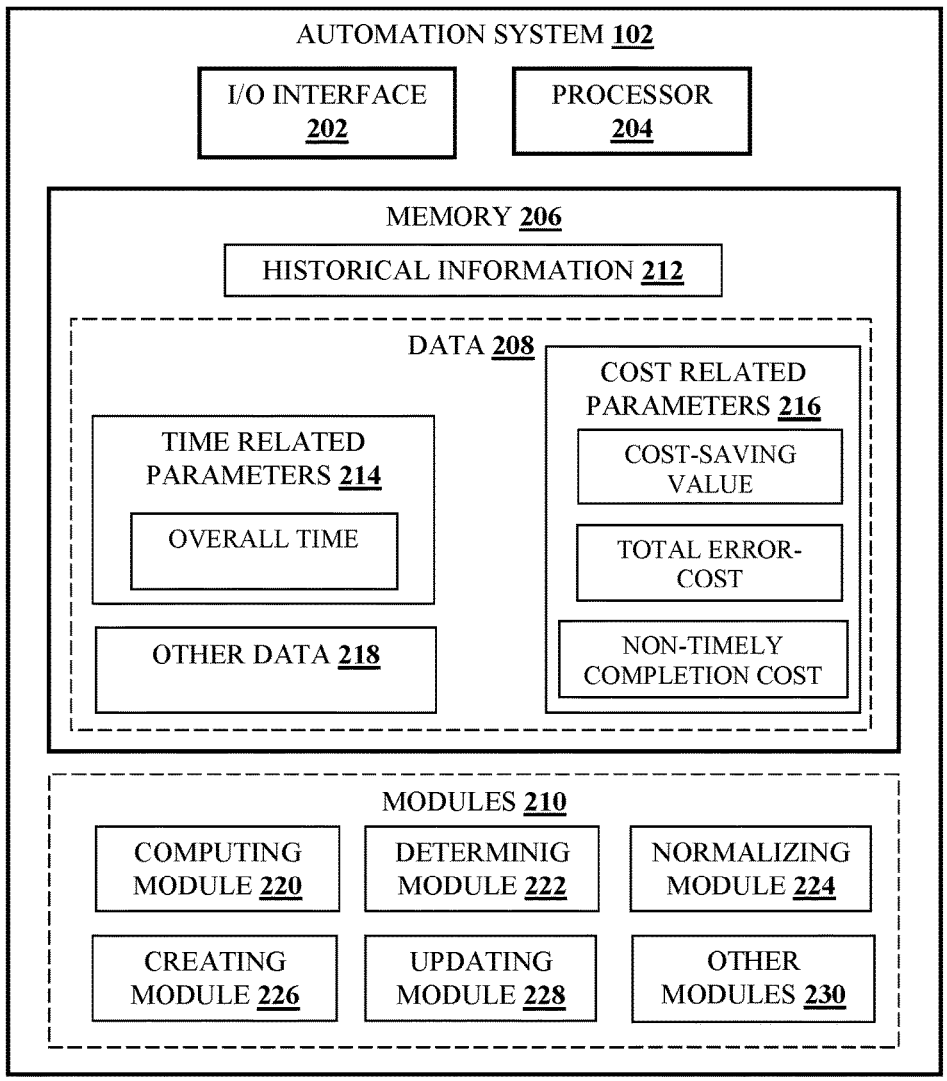
FIG. 2 shows a detailed block diagram illustrating the automation system in accordance with some embodiments of the present disclosure.

FIG. 2 shows a detailed block diagram illustrating the automation system in accordance with some embodiments of the present disclosure.

The automation system 102 comprises an I/O interface 202, a processor 204 and a memory 206. Memory 206 is communicatively coupled to the processor 204. The processor 204 is configured to perform one or more functions of the automation system 102 for valuating the process. In one implementation, the automation system 102 comprises data 208 and modules 210 for performing various operations in accordance with the embodiments of the present disclosure. The memory 206 further comprises a historical information 212. In an embodiment, the data 208 may include, without limitation, time-related parameters 214, cost-related parameters 216 and other data 218. The time-related parameters 214 further comprises an overall time, whereas cost-related parameters 216 further comprises cost-saving value, total error-cost, and non-timely completion cost.

In one embodiment, the data 208 may be stored within the memory 206 in the form of various data structures. Additionally, the aforementioned data 208 can be organized using data models, such as relational or hierarchical data models. The other data 218 may store data, including temporary data and temporary files, generated by modules 210 for performing the various functions of the automation system 102.

In an embodiment, the historical information 212 comprises data pertaining to previous errors detected when the automation is applied on the process. According to embodiments, the historical information 212 may also include other information, for example, time taken for completing different steps in completing the task. Based on the historical information 212, a learning model is build.

In an embodiment, the data 208 may be processed by one or more modules 210. In one implementation, the one or more modules 210 may also be stored as a part of the processor 204. In an example, the one or more modules 210 may be communicatively coupled to the processor 204 for performing one or more functions of the automation system 102.

In one implementation, the one or more modules 210 may include, without limitation, a computing module 220, a determining module 222, a normalizing module 224, a creating module 226, an updating module 228, and other modules 230. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the computing module 220 may compute a plurality of parameters associated with the process. The plurality of parameters comprises time related 214 parameters and cost related parameters 216. The time related parameters comprise an overall time consumed in completion of one or more tasks of an activity in the process when the automation is applied on the process. For example, the overall time is computed for completing three tasks i.e., Task_1, Task_2 and Task_3 of the Activity_A 101-A. Similarly, the overall time is computed for completing the two tasks i.e., Task_1 and Task_2 of the Activity_C 101-C. This may help sorting the tasks of the activities in terms of their time and effort consumed during the completion.

Further, the cost related parameters comprise a cost-saving value in completing the activity when the automation is applied, a total error-cost of manual execution of the process, and a non-timely completion cost corresponding to the one or more tasks. The cost-saving value indicates an overall cost saved by freeing one or more resources employed for execution of the one or more tasks of the activity due to the automation. According to embodiments, a monetary value may be associated with one or more resources. The monetary value associated is based on activity-based costing. In other words, based on the importance or criticality of the activity, the monetary value is associated with that activity. Thus, for any given process the different resources consumed will be tracked for each of the tasks completed. Resources may include human resources or other type of resources. Considering an example, in which, if in Activity_A, X units of time is saved, type of human resources needed is Y, and an average cost of the human resource is Z. Then, the cost-saving due to the automation on the human resource will be computed as X*Y*Z. Similar computation is done for all the resources consumed to determine the cost-saving value i.e., overall cost saved by freeing the resources.

Further, the non-timely completion cost indicates a value when automation is not employed for completing the one or more tasks. For every activity of the process, there is a cost for not completing the activity on time. This may vary from activity to activity or process to process. This cost will stem from various factors like cost of not starting another process on time, loss occurred when the task is not completed on time, waiting time of dependent resources and the like.

Further, for computing the total error cost, the computing module 220, at first, determines one or more errors corresponding to one or more tasks of the activity when the one or more tasks are performed manually. The one or more errors are determined by using a learning model. The creation of the learning model is explained in subsequent paragraphs of the specification. Then, the computing module 220 determines a rectification cost consumed for repeating the one or more tasks when the one or more errors are determined. Based on the determining of the one or more errors and their corresponding rectification cost, the total error cost is computed.

Based on above discussed time related parameters and the cost related parameters and historical information 212 pertaining to previous errors detected when the automation is applied on the process, the creating module 226 creates a learning model. Further, the updating module 228 updates the learning model based on the qualitative parameters comprising a consistency parameter indicating a level of consistency while executing the process upon the applying the automation and ease of use parameter. The consistency parameter and the ease of use parameter is categorized into different levels. For example, on the scale of 1 to 5, 1 indicates poor consistency and 5 indicates full consistency. Similarly, considering the same scale, 1 denotes poor ease of use and 5 is best ease of use.

In an embodiment, the determining module 222 determines a total actual cost saved when an automation is applied on the process based on the above computed parameters i.e., time and cost related parameters. Further, the normalizing module 224 normalizes the total actual cost saved based on the cost related parameters and a cost of automation maintenance.

In an embodiment, the determining module 222 determines a value of the automation based on the total actual cost saved, qualitative parameters associated with the process, and the cost of automation maintenance. The value is categorized into at least one of an automate category, a neutral category and a non-automate category. In other words, these categories provide different recommendations for the automation. The automate category indicates a recommendation of performing the automation for the process. The neutral category indicates a recommendation of performing the automation for the process if all the automation in the automate category is undertaken and additional bandwidth is available to undertake more automation. Further, the non-automate category indicates a recommendation of not performing the automation for the process. Let us understand the above recommendations based on below examples shown in below Table 1.

TABLE 1

| Example 1 | Example 2 | Example 3 | Example 4 |
|---|---|---|---|
| Normalized total actual cost saved = 10 | Normalized total actual cost saved = 2 | Normalized total actual cost saved = 3 | Normalized total actual cost saved = 1 |
| Consistency parameter = 5 | Consistency parameter = 4 | Consistency parameter = 1 | Consistency parameter = 4 |
| Ease of use parameter = 5 | Ease of use parameter = 4 | Ease of use parameter = 3 | Ease of use parameter = 4 |

In the above example 1, it can be observed that the automation gives a 10 times benefit due to the total actual cost saved and also in two other parameters the automation is at the highest level i.e., consistency and ease of use parameter having a level 5 each. Thus, in the example 1, the automation system 102 will provide a recommendation "Automate category" i.e., a recommendation to perform the automation for the process.

In the example 2, it can be observed that the automation gives a 2 times benefit due to the total actual cost saved and also in two other parameters (consistency and ease of use), the automation is at one level less than highest level i.e., at level 4. In this case, the system 102 will provide a recommendation "Neutral category".

In the example 3, it can be observed that the automation gives a 3 times benefit due to the total actual cost saved and also in two other parameters (consistency and ease of use), the automation is not at a good level. Specially, the consistency parameter is very poor. Thus, in this case, the system 102 will provide a recommendation "not-automate category".

In the example 4, it can be observed that automation gives no benefit. Further, in the two other parameters (consistency and ease of use), the automation is at a good level, however, overall the system 102 provides a recommendation of "not-automate category". The system 102 provides different recommendations based on the value computed for the parameters.

Figure 3:
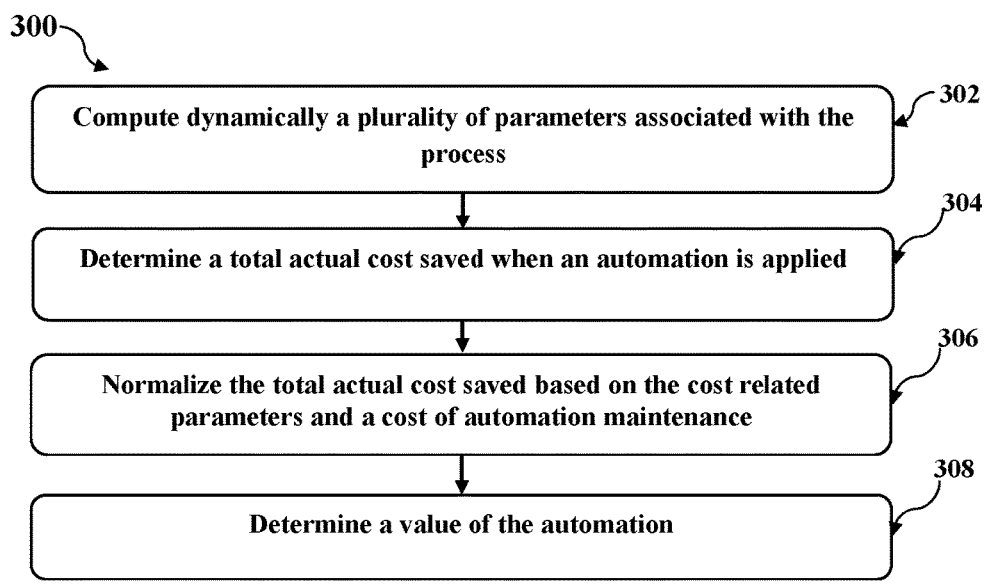
FIG. 3 shows a flowchart illustrating a method of valuating an automation for a process of an enterprise system in accordance with some embodiments of the present disclosure.

FIG. 3 shows a flowchart illustrating a method for valuating an automation for a process of an enterprise system with some embodiments of the present disclosure.

As illustrated in FIG. 3, the method 300 comprises one or more blocks for valuating an automation for a process using an automation system 102. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 302, the automation system 102 computes a plurality of parameters associated with the process. The plurality of parameters comprises time related parameters and cost related parameters. Further, the time related parameters comprise an overall time consumed in completion of one or more tasks of an activity in the process when the automation is applied on the process. Further, the cost related parameters comprise a cost-saving value, a total error-cost, and a non-timely completion cost.

At block 304, the automation system 102 determines a total actual cost saved when an automation is applied on the process based on the time related parameters and the cost related parameters.

At block 306, the automation system 102 normalizes the total actual cost saved based on the cost related parameters and a cost of automation maintenance.

At block 308, the automation system 102 determines a value of the automation based on the total actual cost saved after normalization, qualitative parameters associated with the process, and the cost of automation maintenance. The value is categorized into at least one of an automate category, a neutral category and a non-automate category.

Computer System

Figure 4:
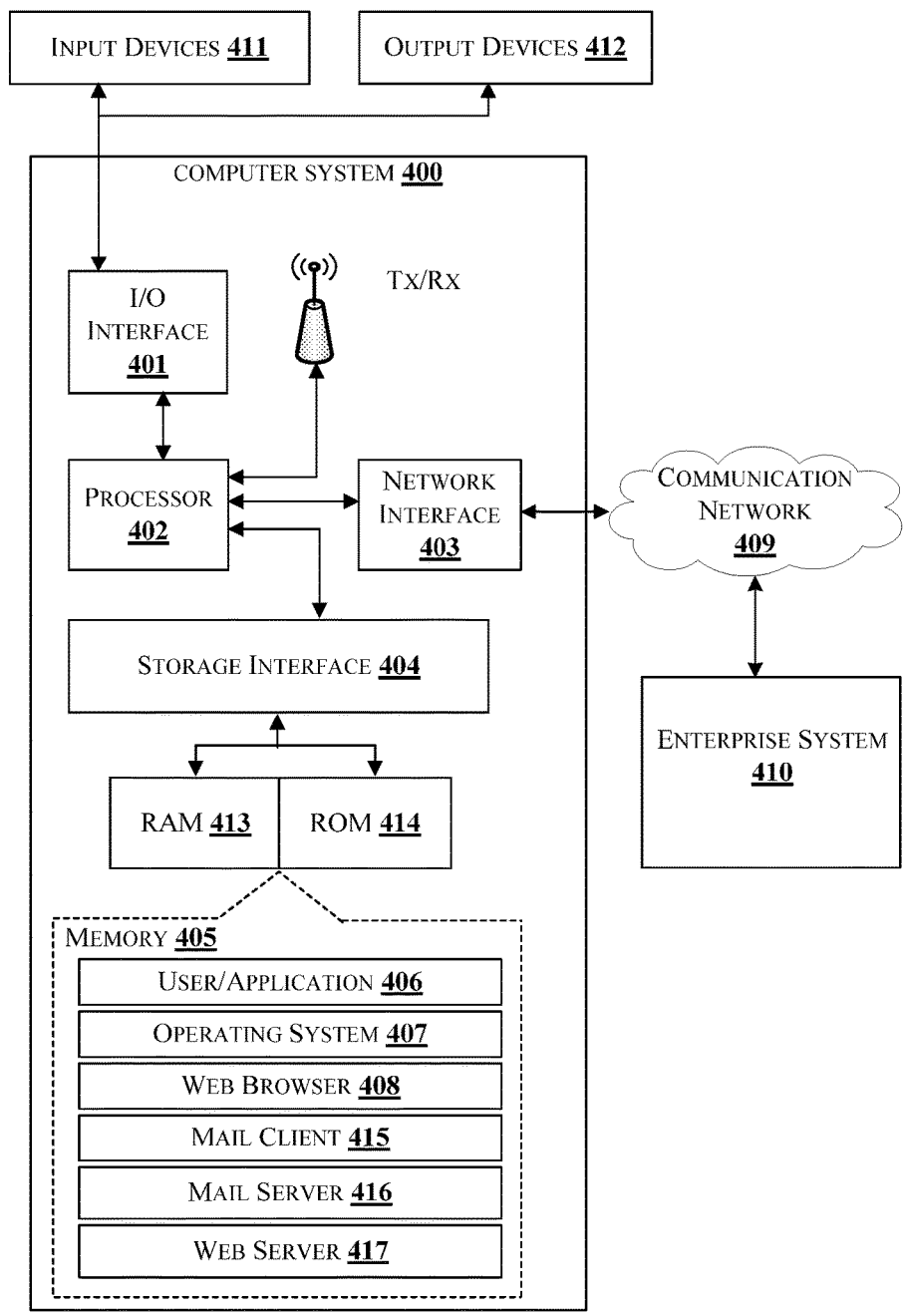
FIG. 4 illustrates a block diagram of an exemplary computer system for implementing embodiments consistent with the present disclosure.

FIG. 4 illustrates a block diagram of an exemplary computer system 400 for implementing embodiments consistent with the present invention. In an embodiment, the computer system 400 can be the automation system 102 which is used for valuating an automation for a process of an enterprise system 410. The computer system 400 may comprise a central processing unit ("CPU" or "processor") 402. The processor 402 may comprise at least one data processor for executing program components for executing user- or system-generated business processes. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The IO interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 401, the computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application data 406, an operating system 407, web browser 408 etc. In some embodiments, computer system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, Net BSD, Open BSD, etc.), Linux distributions (e.g., Red Hat, Ubuntu, K-Ubuntu, etc.), International Business Machines (IBM) OS/2, Microsoft Windows (XP, Vista/7/8, etc.), Apple iOS, Google Android, Blackberry Operating System (OS), or the like. I/O interface 401 may facilitate display, execution, interaction, manipulation, or operation of program components through textual or graphical facilities. For example, I/O interface may provide computer interaction interface elements on a display system operatively connected to the computer system 400, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, the computer system 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure provides a method for valuating the automation in a clear quantitative manner.

In an embodiment, the method of present disclosure facilitates the valuation of the automation not only based on effort saved due their implementation, but it considers several factors like quality and impact level parameters.

In an embodiment, the method of the present disclosure provides a measure of the benefit of the automation before the actual implementation of the automation.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of valuating automation for a process of an enterprise system implemented by an automation computing device, the method comprising:
   dynamically computing a plurality of parameters associated with a process, wherein the plurality of parameters comprises time related parameters and cost related parameters;
   determining a total actual cost saved when an automation is applied on the process based on the time related parameters and the cost related parameters;
   normalizing the total actual cost saved based on the cost related parameters and a cost of automation maintenance;
   determining and outputting a value of the automation based on the total actual cost saved after normalization, one or more qualitative parameters associated with the process and the cost of automation maintenance, wherein the value is categorized into at least one of an automate category, a neutral category, or a non-automate category, the automate category indicates a recommendation of performing the automation for the process, the neutral category indicates a recommendation of performing the automation for the process when all the automation in the automate category is undertaken and additional bandwidth is available to undertake more automation, and the non-automate category indicates a recommendation of not performing the automation for the process;
   creating a learning model based on the plurality of parameters and historical information pertaining to one or more previous errors detected when the automation is applied on the process; and
   updating the learning model based on the qualitative parameters comprising a consistency parameter, indicating a level of consistency while executing the process, and an ease of use parameter.

2. The method as claimed in claim 1, wherein the time related parameters comprise an overall time consumed in completion of one or more tasks of an activity in the process when the automation is applied on the process.

3. The method as claimed in claim 1, wherein the cost related parameters comprise:
   a cost-saving value in completing the activity when the automation is applied, wherein the cost-saving value indicates an overall cost saved by freeing one or more resources employed in the one or more tasks of the activity due to the automation;
   a total error-cost of manual execution of the process; and
   a non-timely completion cost corresponding to the one or more tasks, wherein the non-timely completion cost indicates a value when the automation is not employed for completing the one or more tasks.

4. The method as claimed in claim 3, further comprising, in order to measure the total error cost:
   determining when one or more errors corresponding to one or more tasks of the activity when the one or more tasks are performed manually have occurred, wherein the one or more errors are determined using a learning model; and
   determining a rectification cost consumed for repeating the one or more tasks when the determining indicates that the one or more errors have occurred.

5. An automation computing device comprising a memory comprising programmed instructions stored thereon and one or more processors coupled to the memory and configured to be capable of executing the stored programmed instructions to:
   dynamically compute a plurality of parameters associated with a process, wherein the plurality of parameters comprises time related parameters and cost related parameters;
   determine a total actual cost saved when an automation is applied on the process based on the time related parameters and the cost related parameters;
   normalize the total actual cost saved based on the cost related parameters and a cost of automation maintenance;
   determine and output a value of the automation based on the total actual cost saved after normalization, one or more qualitative parameters associated with the process and the cost of automation maintenance, wherein the value is categorized into at least one of an automate category, a neutral category, or a non-automate category, the automate category indicates a recommendation of performing the automation for the process, the neutral category indicates a recommendation of performing the automation for the process when all the automation in the automate category is undertaken and additional bandwidth is available to undertake more automation, and the non-automate category indicates a recommendation of not performing the automation for the process;
   create a learning model based on the plurality of parameters and historical information pertaining to one or more previous errors detected when the automation is applied on the process; and
   update the learning model based on the qualitative parameters comprising a consistency parameter, indicating a level of consistency while executing the process, and an ease of use parameter.

6. The automation computing device of claim 5, wherein the time related parameters comprise an overall time consumed in completion of one or more tasks of an activity in the process when the automation is applied on the process.

7. The automation computing device of claim 5, wherein the cost related parameters comprise:
   a cost-saving value in completing the activity when the automation is applied, wherein the cost-saving value indicates an overall cost saved by freeing one or more resources employed in the one or more tasks of the activity due to the automation;
   a total error-cost of manual execution of the process; and
   a non-timely completion cost corresponding to the one or more tasks, wherein the non-timely completion cost indicates a value when the automation is not employed for completing the one or more tasks.

8. The automation computing device of claim 7, wherein the one or more processors are further configured to be capable of executing the stored programmed instructions to, in order to measure the total error cost:
  determine when one or more errors corresponding to one or more tasks of the activity when the one or more tasks are performed manually have occurred, wherein the one or more errors are determined using a learning model; and
  determine a rectification cost consumed for repeating the one or more tasks when the determining indicates that the one or more errors have occurred.

9. A non-transitory computer readable medium comprising programmed instructions stored thereon for valuating automation for a process of an enterprise system that when executed by one or more processors cause the one or more processors to:
  dynamically compute a plurality of parameters associated with a process, wherein the plurality of parameters comprises time related parameters and cost related parameters;
  determine a total actual cost saved when an automation is applied on the process based on the time related parameters and the cost related parameters;
  normalize the total actual cost saved based on the cost related parameters and a cost of automation maintenance;
  determine and output a value of the automation based on the total actual cost saved after normalization, one or more qualitative parameters associated with the process and the cost of automation maintenance, wherein the value is categorized into at least one of an automate category, a neutral category, or a non-automate category, the automate category indicates a recommendation of performing the automation for the process, the neutral category indicates a recommendation of performing the automation for the process when all the automation in the automate category is undertaken and additional bandwidth is available to undertake more automation, and the non-automate category indicates a recommendation of not performing the automation for the process;
  create a learning model based on the plurality of parameters and historical information pertaining to one or more previous errors detected when the automation is applied on the process; and
  update the learning model based on the qualitative parameters comprising a consistency parameter, indicating a level of consistency while executing the process, and an ease of use parameter.

10. The non-transitory computer readable medium of claim 9, wherein the time related parameters comprise an overall time consumed in completion of one or more tasks of an activity in the process when the automation is applied on the process.

11. The non-transitory computer readable medium of claim 9, wherein the cost related parameters comprise:
  a cost-saving value in completing the activity when the automation is applied, wherein the cost-saving value indicates an overall cost saved by freeing one or more resources employed in the one or more tasks of the activity due to the automation;
  a total error-cost of manual execution of the process; and
  a non-timely completion cost corresponding to the one or more tasks, wherein the non-timely completion cost indicates a value when the automation is not employed for completing the one or more tasks.

12. The non-transitory computer readable medium of claim 11, wherein the programmed instructions, when executed by the one or more processors, further cause the one or more processors to, in order to measure the total error cost:
  determine when one or more errors corresponding to one or more tasks of the activity when the one or more tasks are performed manually have occurred, wherein the one or more errors are determined using a learning model; and
  determine a rectification cost consumed for repeating the one or more tasks when the determining indicates that the one or more errors have occurred.

* * * * *